Patented Mar. 8, 1927.

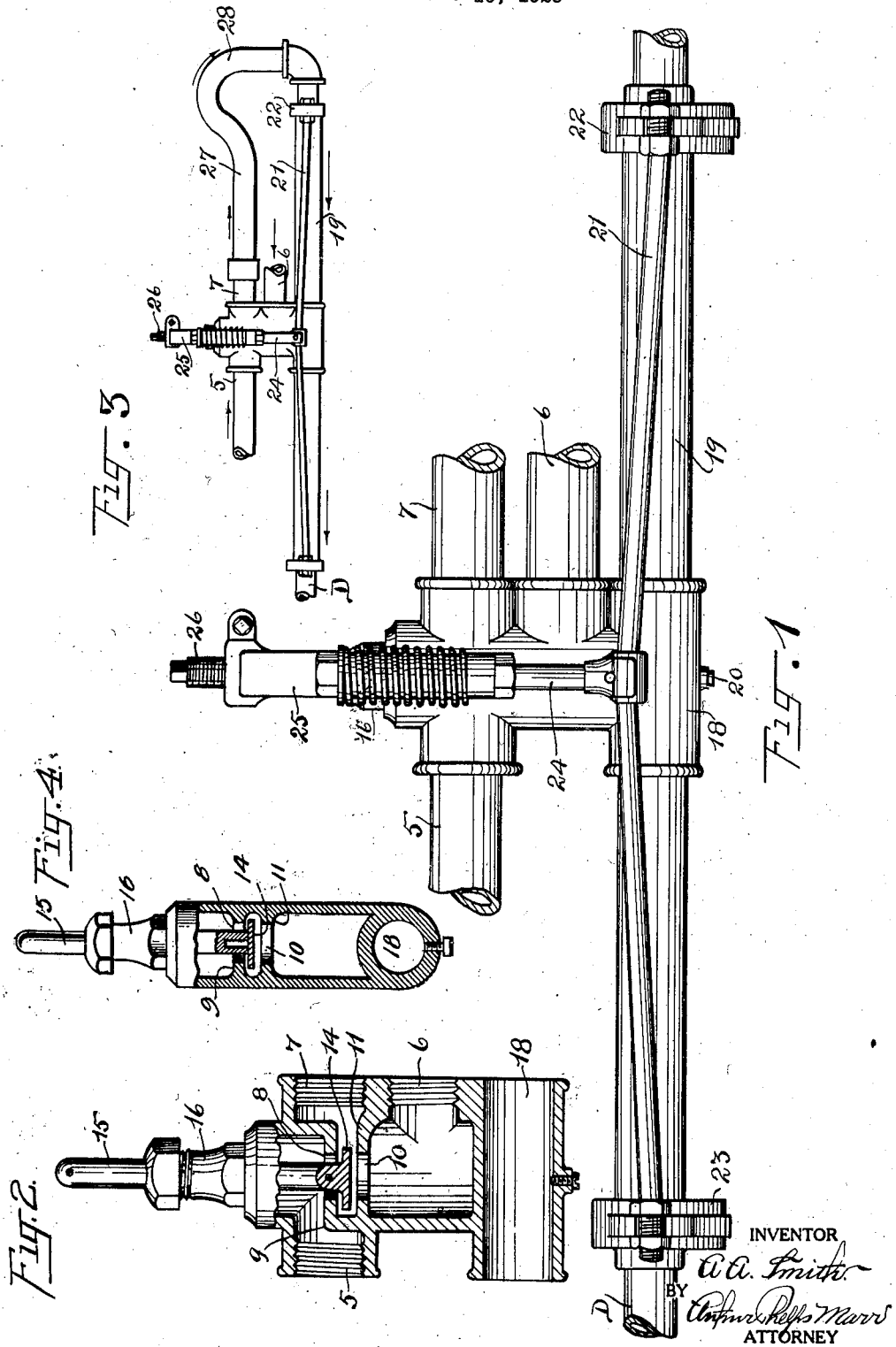

1,620,238

UNITED STATES PATENT OFFICE.

ALLEN A. SMITH, OF GREAT NOTCH, NEW JERSEY.

TEMPERATURE-CONTROLLED FLUID-MIXING DEVICE.

Application filed January 10, 1925. Serial No. 1,604.

The device, the subject of this invention is intended as a means for mixing fluids of different temperatures and obtaining therefrom a mixture of the fluids at a pre-determined temperature and the special objects of the invention are to provide means for controlling the passage of each of the fluids and for varying the relative quantities of each fluid passing the valve mechanism.

Another object of the invention is to provide a thermostatically operated or a temperature operated mechanism that will vary the passage of different fluids and cause the discharge of such comparative quantities of each fluid as will maintain a pre-determined temperature at the discharge point.

Another object of the invention is to provide a positive means for controlling the quantity flow of each fluid and yet be so conditioned that the passage of both fluids cannot be simultaneously interrupted and a further object of the invention is to provide an efficient mixing device for fluids of different temperatures, insuring a discharge of mixed fluids at a given temperature.

With these objects in view, the following is what I consider the best means of carrying out my invention and the accompanying drawing should be referred to for a complete understanding of the specification which follows.

In the drawing:—

Fig. 1, is a side elevation of my device.

Fig. 2, a sectional view through the valve.

Fig. 3, a diagrammatic view, showing my device in a condition of operation.

Fig. 4, is a sectional view through the body of the valve and at right angles to the view shown in Fig. 2.

Similar reference numerals indicate like parts in all the figures where they appear.

My device consists of a valve controlled mixing chamber and an expansible member and mechanism for controlling the valve.

The valve is arranged between two entry ports and referring to the drawing I show the entry or admission pipes at 5 and 6. It is my intention that fluid at one temperature shall enter through one of the pipes and fluid at another temperature shall enter through the other pipe to be co-mingled and so that the device may be readily appreciated and more conveniently referred to in the specification, let us assume that the fluids which we are mixing are water and steam, although fluids of any nature may be mixed in my device. Let us assume that cold water is entering through the pipe 5 and hot water or steam is entering through the pipe 6 and that it is desired to discharge water at a pre-determined temperature from the conduit 7.

The water entering at 5 in Fig. 2, will pass through the port 8 in the barrier 9 and meeting the steam entering at 6 and passing through the port 10 in the barrier 11, will be discharged co-mingled, through the conduit 7.

To obtain a control of the quantity of either steam or water, I arrange a valve 14 between the barriers 9 and 11 and the ports therein and as this valve is raised or lowered, the quantity of steam will be controlled and so will the comparative quantity of cold water.

It is my intention that the valve and its controlling means be so positioned that the valve cannot be closed tight upon either its upper or lower seat and if, through improper adjustment is closed on its upper seat, the lower port will be open to its greatest extent.

The valve 14 is supported upon a valve stem 15 which passes through the usual stuffing box 16 in which the valve stem is slideable.

It will be noted that the fitting in which the valve is supported is provided to receive the admission pipes or conduits 5 and 6 and the discharge conduit 7. It will also be noted that this fitting is provided with a tubular passage 18 for a purpose that shall appear later.

The control of the valve is by means of a readily expansible member which may be a brass or copper tube. Such a tube is shown at 19 in Figs. 1 and 3 and passes through the tubular passage 18 in the valve fitting. The fitting may be secured to the tube 19 by means of a set screw 20 and the fitting should be arranged at approximately mid length of the tube 19.

Arranged at each side of the tube 19 are rods 21, one end of each said rod being anchored to fittings 22 and 23, one arranged at each end of the tube 19. The rods 21 are flexible and resilient and tend to assume a position parallel with the tube 19.

At about mid length of each rod 21, I secure a vertical rod 24, the upper end of which is connected to a bracket 25, in which is arranged a screw 26, which screw is pinned to the upper end of the valve rod 15.

Conduits or pipes are connected to each of the fittings 22 and 23 and to the conduit which enters the fitting 22, I connect a bowed pipe 27, which is also connected to the discharge conduit 7 previously described as entering the valve containing fitting. This pipe is provided with a bow or elbow 28 to care for the expansion of the pipe 27 and may, obviously, be of any desired length.

It is thought that the operation of my device will be fully understood from the foregoing description, but, I will, however, briefly, again, describe it.

Water entering at 5 passes through the port 8 and meets steam entering at 6 and passing through the port 10. The steam and water together are discharged at 7 through the pipe 27 and are caused to pass through the expansible member 19. If the temperature of the mixture is greater than the pre-determined temperature, the member 19 will expand, and by straightening the rod 21 will, through the vertical rods 24 and bracket 25 cause the valve 14 to approach the port 10, partially closing this port. If, on the other hand, the temperature of the mixture passing through the member 19 is too low, this member 19 will contract, causing the valve 14 to approach the port 8, partially closing this port and opening the passage through the port 10 to a greater extent and the operation of the valve will follow each change in temperature of the mixture passing through the pipe 19, with a result that the mixed fluids discharged at D will be so discharged at a pre-determined temperature.

As previously set forth, this device is adapted to a great number of uses and I have successfully utilized it in controlling oil passing to oil burners or to or from stills. For heavier materials, the valve may be given a greater clearance and a greater extent of operation and other modifications may be made within the scope of the appended claims without departing from the principle or sacrificing the advantages of the invention.

Having carefully and fully described my invention, what I claim and desire to obtain is:—

1. In a device of the character described, a fitting having a plurality of inlet passages and a discharge passage and an independently formed tubular passage therethrough, a valve for controlling both inlet passages, an expansible member extending through said tubular passage and having means connected thereto for controlling said valve, and means for causing the discharge from said fitting to pass through said expansible member.

2. A mixing device comprising inlet passages for fluids at different temperatures and a discharge passage for the co-mingled fluid, an expansible member and means for connecting the discharge of said fitting with said expansible member and a plurality of bowed rods and a valve operated thereby, said bowed rods and said valve being operated by said expansible member to control the admission of fluids at different temperatures into said fitting.

Signed at the city, county and State of New York, this 20 day of October, 1924.

A. A. SMITH.